Figure 1:
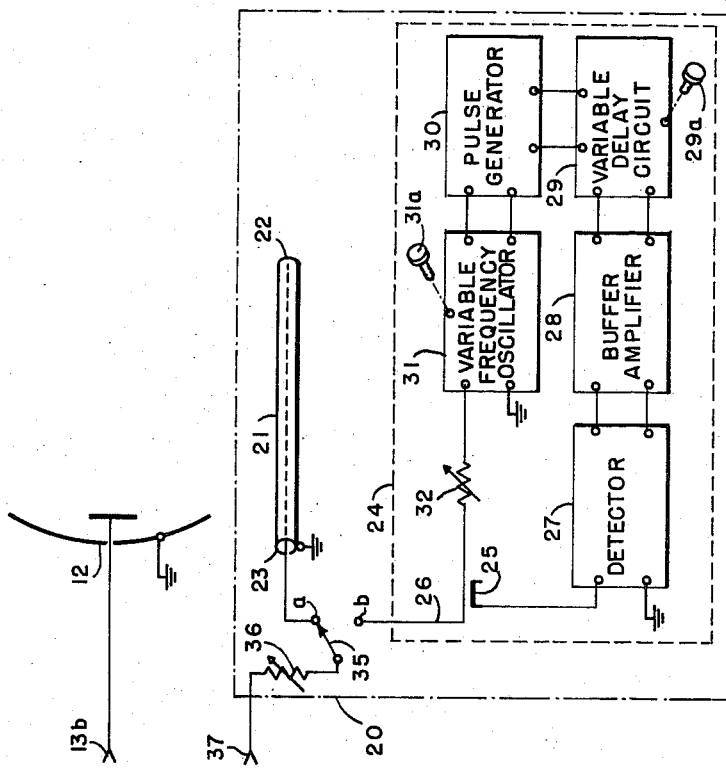

Oct. 21, 1958　　　C. E. SCHWAB　　　2,857,593

RADAR TESTING APPARATUS

Filed Aug. 12, 1955

United States Patent Office 2,857,593
Patented Oct. 21, 1958

2,857,593

RADAR TESTING APPARATUS

Carl E. Schwab, Flushing, N. Y., assignor to Hazeltine Research, Inc., Chicago, Ill., a corporation of Illinois Application August 12, 1955, Serial No. 527,899

6 Claims. (Cl. 343—17.7)

General

This invention relates to apparatus for testing the performance characteristics of a radar system including a transmitter and a receiver.

It has heretofore been proposed to test the performance characteristics of a radar system by utilizing transmitter-receiver apparatus which is responsive to the radar pulses developed by the radar system for generating reply pulses which are supplied back to the radar system for determining the operating condition thereof. To obtain an indication of the absolute condition of the radar system by means of apparatus of this type, it is necessary to know the absolute power level of the reply pulses. Such apparatus, however, suffers from the disadvantage of not readily providing an indication of the absolute operating condition of the radar system. Also, in order to insure that the results obtained with such apparatus are reliable, it is necessary that the pulse shape and radio-frequency carrier frequency of the reply pulses are identical to the corresponding characteristics of the transmitted radar pulses. These conditions are difficult to fulfill, and apparatus capable of fulfilling such conditions would be more complex than is desirable in most apparatus.

It is an object of the invention, therefore, to provide new and improved radar testing apparatus which avoids one or more of the foregoing limitations of such apparatus heretofore proposed.

In accordance with the invention, apparatus for testing the performance characteristics of a radar system including a transmitter and a receiver comprises first means responsive to each radar pulse developed by the transmitter for producing a delayed reflection of each such radar pulse which is supplied back to the radar system for determining the operating condition thereof at a predetermined time interval after each radar pulse. The testing apparatus also includes second means responsive to each radar pulse for independently generating a delayed reply pulse, the time delay of which is adjustable, for determining the operating condition of the radar system at other selected time intervals after each radar pulse. The testing apparatus further includes means for selectively coupling either the first means or the second means to the radar system at a point common to both the transmitter and the receiver for enabling the first means to provide a reference pulse to establish a reference operating condition to which the measurements obtained by the second means may be referred.

For a better understanding of the present invention, together with other and further objects thereof, reference is had to the following description taken in connection with the accompanying drawing, and its scope will be pointed out in the appended claims.

Figure 2:
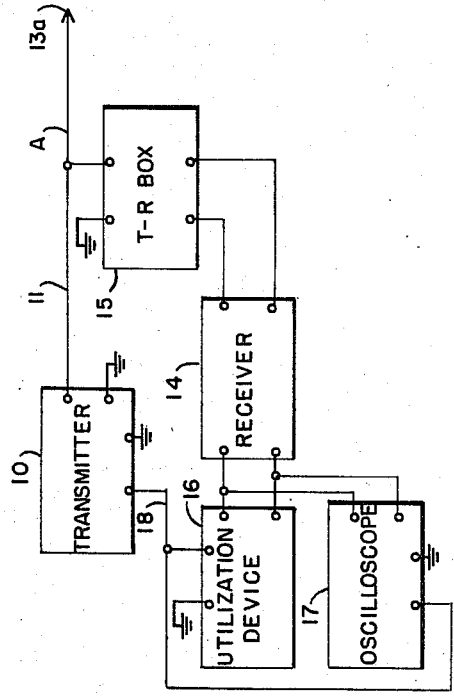
Figure 2:
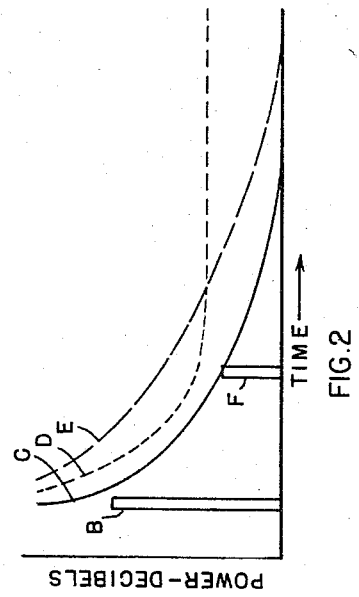

Referring to the drawing:

Fig. 1 is a circuit diagram, partly schematic, of a radar system and radar testing apparatus constructed in accordance with the present invention, and Fig. 2 is a graph used in explaining the operation of the Fig. 1 apparatus.

Description and operation of radar system

Referring to Fig. 1 of the drawing, there is represented a more or less conventional radar system which comprises a transmitter 10 for generating periodic pulses or bursts of radio-frequency energy, commonly called "radar pulses," which are supplied by way of a suitable transmission line 11 to a radar antenna 12, the radar antenna 12 being coupled to the transmission line 11 by engaging suitable couplers 13a and 13b. Under normal operating conditions, the antenna 12 is effective to radiate the radar pulses towards distant targets and to intercept echoes of these pulses after reflection from the distant targets.

The echo pulses are supplied by the antenna 12 to a radar receiver 14 by way of a conventional T.-R. box 15. The T.-R. box 15 includes a gaseous discharge tube which operates in the usual manner to protect the receiver 14 during the occurrence of each of the high-power radar pulses at the transmitter 10. The receiver 14, which may also be of conventional construction, serves to amplify and detect the target echo pulses supplied thereto.

The detected target echo pulses present at the output of the receiver 14 are supplied to a suitable utilization device 16, the exact nature of which depends upon the use to which the radar system is being put. For some applications, the utilization device 16 may include suitable cathode-ray oscilloscope apparatus for enabling determination of the distance of the distant targets. Also coupled to the output terminals of the receiver 14 is a cathode-ray oscilloscope 17 for monitoring the output signals of the receiver 14. Both the utilization device 16 and the oscilloscope 17 may be synchronized by way of suitable signals from the transmitter 10 supplied by way of a conductor 18.

Description of testing apparatus

Referring further to Fig. 1 of the drawing, there is shown radar testing apparatus 20, constructed in accordance with the present invention, for testing the radar system represented by units 10–18, inclusive. The radar testing apparatus 20 includes first means responsive to each radar pulse developed by the transmitter 10 for producing a delayed reflection of each such radar pulse which is supplied back to the radar system for determining the operating condition thereof at a predetermined time interval after each radar pulse. Such means may comprise, for example, a length of transmission line 21 having an impedance mismatch at one end 22 and to the other end 23 of which may be supplied the radar pulses developed by the transmitter 10. The transmission line 21 may be, for example, of the coaxial type as shown, and the impedance mismatch at the end 22 thereof may be produced by having an open circuit at that end 22.

The radar testing apparatus 20 also includes second means 24 responsive to each radar pulse for independently generating a delayed reply pulse, the time delay of which is adjustable, for determining the operating condition of the radar system at other selected time intervals after each radar pulse. This second means 24 is a transmitter-receiver unit which includes a pickup loop 25 which is suitably positioned adjacent an input conductor 26 for supplying the radar pulses from the transmitter 10 to a detector unit 27 wherein they are detected. The resulting video signal at the output of the detector 27 is then supplied by way of a buffer amplifier 28 to a variable delay circuit 29 which serves to delay the detected video pulses a desired amount. The desired delay may be selected by means of a suitable control knob 29a. These delayed video pulses are, in turn, supplied to a pulse generator 30 which, in response thereto, generates corresponding pulses of fixed amplitude and shape. These pulses from the pulse generator 30 are, in turn, supplied to a variable frequency oscillator 31 for causing this oscillator to produce corresponding bursts of radio-frequency energy which serve as the reply pulses that are supplied back to the radar system for determining, for example, the relative loop sensitivity thereof. The frequency of oscillator 31 may be adjusted by means of a suitable control knob 31a. For purposes as will be mentioned hereinafter, the reply pulses are supplied back to the radar system by way of a calibrated attenuator 32.

The radar testing apparatus 20 further includes means for selectively coupling either the transmission line 21 or the transmitter-receiver unit 24 to the radar system at a point "A" which is common to both the transmitter 10 and the receiver 14 of the radar system for enabling the transmission line 21 to establish a reference operating condition of the radar system to which the measurements obtained by the transmitter-receiver unit 24 may be referred. This coupling means may comprise, for example, a switch 35, having a first operating position "a" and a second position "b." This switch 35 is coupled to the common point A of the radar system by way of a calibrated attenuator 36 and a suitable coupler 37, which is designed to mate with the coupler 13a.

The units 27–31, inclusive, of the testing apparatus 20 may be of conventional construction and operation so that a detailed description and operation thereof are unnecessary herein.

*Operation of testing apparatus*

Considering now the operation of the radar testing apparatus 20 just described, the testing apparatus 20 may be coupled to the radar system, for example, by disconnecting the radar antenna 12 and connecting the coupler 37 of the testing apparatus 20 to the coupler 13a of the radar system. In this manner, the radar testing apparatus 20 may be utilized to determine the operating condition of the radar system and especially to determine the loop sensitivity of such radar system during the recovery interval subsequent to the occurrence of each radar pulse at the output of transmitter 10. By loop sensitivity is meant the difference in signal magnitude between the transmitted radar pulse and the detected echo pulse at the receiver 14 output when the pulse at the receiver 14 output is of a predetermined value. It will thus be apparent that this factor is, in reality, a measure of the performance of the radar equipment. Thus, for a given target range, a radar system having a high loop sensitivity will be able to detect smaller targets than a radar system having a low loop sensitivity.

It might be thought that it should only be necessary to determine the loop sensitivity of the radar system for a single target range in order to obtain an adequate measure of the performance of the radar system. As is known, however, the T.-R. box 15 of the radar system serves to protect the receiver 14 by effectively becoming a short circuit when the gaseous discharge tube of the T.-R. box 15 is ionized. Also, it is usual practice to afford further protection by gating certain circuits of the receiver 14 to a non-conductive condition during the occurrence of the radar pulses. As a result, a certain time interval is required for the receiver 14 and the T.-R. box 15 to recover their normal signal-translating characteristics after the occurrence of each radar pulse. As a result, the loop sensitivity of the radar system during this recovery interval is very much dependent on the state of recovery of these units and, hence, the loop sensitivity for one target range may be completely unrelated to the loop sensitivity at another target range. Testing apparatus constructed in accordance with the present invention, however, permits ready determination of such loop sensitivity during this recovery interval.

Referring to Fig. 2 of the drawing, curve B represents one of the radar pulses produced by the transmitter 10. Curve C is a composite curve which represents the rate at which the receiver 14 and the T.-R. box 15 recover their normal operating sensitivity subsequent to the occurrence of the radar pulse represented by curve B. More precisely, curve C represents the power required at the common point "A" of the radar system in order to produce a predetermined magnitude of output signal at the output of the receiver 14. For many applications it is essential that the radar system achieve its optimum sensitivity at least at some minimum prescribed rate. Otherwise, target echoes received during this recovery interval will be either lost altogether or else improperly interpreted. Accordingly, it is frequently essential to obtain a point-by-point plot of this recovery curve in order to ascertain that the radar system is operating properly. Also, if the system is not operating properly, knowledge of the recovery curve affords information for properly servicing the radar equipment. It shall be assumed that curve C represents the desired rate of the recovery of the radar system under consideration, in which case curves D and E represent possible recovery characteristics that occur when the radar system is not recovering at the desired rate.

The transmitter-receiver unit 24 of the radar testing equipment 20 may readily be utilized for obtaining an indication of the relative sensitivity of the radar system at various time intervals after each radar pulse, the time interval depending upon the delay setting of the variable delay circuit 29. More specifically, with the switch 35 set in position "b," the unit 24 generates one reply pulse, for example the pulse represented by curve F of Fig. 2, in response to each radar pulse from the transmitter 10. This reply pulse is supplied back to the receiver 14 of the radar system by way of the T.-R. box 15, and, hence, serves to produce a video signal at the output of receiver 14 which may then be observed on the oscilloscope 17. Utilizing reply pulses in this manner permits relative determinations of the loop sensitivity to be made because of the fact that a certain magnitude of reply pulse is needed at the common point "A" in order to produce a given output signal at the output terminals of receiver 14. In other words, the magnitude of the reply signals required from the testing apparatus 20 to produce a predetermined receiver 14 output is a measure of the loop sensitivity of the radar system. The greater the magnitude required, the less sensitive is the radar system. By adjusting the time of occurrence of the reply pulse, the loop sensitivtity of the radar system can be determined at any selected time interval after the radar pulse occurs, thereby enabling a point-by-point plot of the recovery curve of the system. Without knowing the absolute magnitude of the reply pulses, however, the determination thus made is relative only.

The transmission line 21 of the testing apparatus 20 affords a convenient means for determining the absolute sensitivity of the radar system but at a given point only. This is because the time delay afforded by the transmission line 21 is fixed in length and, hence, the reflected radar pulses developed thereby may only have this one value of time delay. However, when the measurement obtained with the transmission line 21 is used to calibrate the transmitter-receiver unit 24, the relative measurements of the unit 24 are then known on an absolute basis so that the resulting plot of the recovery curve is also known on an absolute basis. As a result, the performance of the radar system which is tested may be compared with a set of standard performance characteristics for radar systems of that type.

Considering, in more detail, the specific procedure that may be utilized for obtaining a measure of the recovery curve of the radar system and, hence, determining the loop sensitivity thereof during the recovery interval, it is necessary to decide on some standard of performance which should be required of the radar system. More specifically, it is first necessary to determine the desired magnitude of signal that shall be required at the output terminals of receiver 14. This in effect, fixes the power level at this point. Now it is also necessary to determine the amount of composite signal gain that is to be required of the receiver 14 and T.-R. box 15 at a particular time subsequent to the occurrence of the radar pulse. The time factor is selected to correspond to the round-trip delay time of the transmission line 21. Fixing the receiver gain at this time, in effect, fixes the power level required of the reply signal at the common point "A" of the radar system at this time. Thus, the attenuation required of the calibrated attenuator 36 and the transmission line 21 may be fixed for the ideal radar system. In this manner, a particular attenuation setting of the calibrated attenuator 36 is taken as the reference setting for a radar system that is functioning properly.

Where the radar system is functioning in a normal manner and with switch 35 in position "a," each radar pulse from the transmitter 10 is supplied by way of the attenuator 36 to the transmission line 21 and is subsequently reflected off the end 22 thereof and then travels this same path back to the common point "A" of the radar system. With the attenuator 36 set at the reference point, such reflected radar pulses will produce the desired predetermined output at the output of the receiver 14 provided the loop sensitivity of the radar system is of the proper value. In this manner, the reference setting of the attenuator 36 indicates a certain magnitude of loop sensitivity for the properly operating radar system. If the sensitivity of the system at this time departs from the desired value as a result of the system recovering at other than the desired rate, then either more or less attenuation is required of the attenuator 36 in order to produce the same signal magnitude at the output of the receiver 14. This change in attenuation as read from the calibrated dial of the attenuator 36 indicates the change in the power level of the recovery curve of the system at this particular moment of time.

Now, in order to determine the sensitivity of the system at other moments of time, the switch 35 is placed in position "b." With the switch 35 in this position, the delay setting of the variable delay circuit 29 is set to correspond with the round-trip delay time of the transmission line 21, and the frequency of the oscillator 31 is adjusted to give a maximum indication on the oscilloscope 17. Now, the second calibrated attenuator 32 is adjusted to give the same magnitude of signal at the output of receiver 14 as was obtained with the transmission line 21. In this condition, the reply pulses, generated by the oscillator 31, as they appear at the coupler 37 of the testing apparatus, are identical in magnitude to those reflected pulses formerly supplied by the transmission line 21 when the switch 35 was in position "a."

In order to make the relative measurements, the time delay of the variable delay circuit 29 is adjusted to the next desired moment of time and the calibrated attenuator 32 is readjusted until the predetermined signal magnitude is reproduced at the output of receiver 14. This readjustment required of the calibrated attenuator 32, as indicated by the calibrated dial thereof, denotes the change in loop sensitivity from that existing at the reference time and, hence, indicates the sensitivity level of the radar system at this time. In this manner, by adjusting the delay setting of the variable delay circuit 29 and the attenuation setting of the calibrated attenuator 32, the values of the recovery curve may be determined for any number of time increments, thereby enabling the recovery curve to be plotted on an absolute basis.

From the foregoing, it will be apparent that radar testing apparatus constructed in accordance with the present invention affords a convenient and reliable method of determining the loop sensitivity of a radar system during the recovery thereof. It will be noted that the relative measurements made by means of the transmitter-receiver portion 24 of the apparatus 20 are made without resort to complex circuitry and apparatus for taking into account the shape, frequency, and amplitude of the reply pulses developed thereby.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. Apparatus for testing the performance characteristics of a radar system including a transmitter and a receiver, the apparatus comprising: first means responsive to each radar pulse developed by the transmitter for producing a delayed reflection of each such radar pulse which is supplied back to the radar system for determining the operating condition thereof at a predetermined time interval after each radar pulse; second means responsive to each radar pulse for independently generating a delayed reply pulse the time delay of which is adjustable for determining the operating condition of the radar system at other selected time intervals after each radar pulse; and means for selectively coupling either the first means or the second means to the radar system at a point common to both the transmitter and the receiver for enabling the first means to provide a reference pulse to establish a reference operating condition to which the measurements obtained by the second means may be referred.

2. Apparatus for testing the performance characteristics of a radar system including a transmitter and a receiver, the apparatus comprising: first means responsive to each radar pulse developed by the transmitter for producing a delayed reflection of each such radar pulse which is supplied back to the radar system for determining the absolute loop sensitivity thereof at a predetermined time interval after each radar pulse; second means responsive to each radar pulse for independently generating a delayed reply pulse the time delay of which is adjustable for determining the relative loop sensitivity of the radar system at other selected time intervals after each radar pulse; and means for selectively coupling either the first means or the second means to the radar system at a point common to both the transmitter and the receiver for enabling the first means to provide a reference pulse to establish the absolute loop sensitivity of the radar system to which the measurements of relative loop sensitivity obtained by the second means may be referred.

3. Apparatus for testing the performance characteristics of a radar system including a transmitter and a receiver, the apparatus comprising: a length of transmission line having an impedance mismatch at one end and to the other end of which may be supplied each radar pulse developed by the transmitter, the transmission line being effective for producing a delayed reflection of each such radar pulse which is supplied back to the radar system for determining the operating condition thereof at a predetermined time interval after each radar pulse; second means responsive to each radar pulse for independently generating a delayed reply pulse the time delay of which is adjustable for determining the operating condition of the radar system at other selected time intervals after each radar pulse; and means for selectively coupling either the transmission line or the second means to the radar system at a point common to both the transmitter and the receiver for enabling the transmission line to provide a reference pulse to establish a reference operating condition to which the measurements obtained by the second means may be referred.

4. Apparatus for testing the performance characteristics of a radar system including a transmitter and a receiver, the apparatus comprising: first means responsive to each radar pulse developed by the transmitter for producing a delayed reflection of each such radar pulse which is supplied back to the radar system for determining the operating condition thereof at a predetermined time interval after each radar pulse; transmitter-receiver means responsive to each radar pulse for independently generating a delayed reply pulse and including an adjustable time-delay circuit for enabling adjustment of the time delay of the reply pulse for determining the operating condition of the radar system at other selected time intervals after each radar pulse; and means for selectively coupling either the first means or the transmitter-receiver means to the radar system at a point common to both the transmitter and the receiver for enabling the first means to provide a reference pulse to establish a reference operating condition to which the measurements obtained by the transmitter-receiver means may be referred.

5. Apparatus for testing the performance characteristics of a radar system including a transmitter and a receiver, the apparatus comprising: first means responsive to each radar pulse developed by the transmitter for producing a delayed reflection of each such radar pulse which is supplied back to the radar system for determining the operating condition thereof at a predetermined time interval after each radar pulse; second means responsive to each radar pulse for independently generating a delayed reply pulse the time delay of which is adjustable for determining the operating condition of the radar system at other selected time intervals after each radar pulse; and switching means for selectively coupling either the first means or the second means to the radar system at a point common to both the transmitter and the receiver for enabling the first means to provide a reference pulse to establish a reference operating condition to which the measurements obtained by the second means may be referred.

6. Apparatus for testing the performance characteristics of a radar system including a transmitter and a receiver, the apparatus comprising: a length of transmission line having an impedance mismatch at one end and to the other end of which may be supplied each radar pulse developed by the transmitter, the transmission line being effective for producing a delayed reflection of each such radar pulse which is supplied back to the radar system for determining the operating condition thereof at a predetermined time interval after each radar pulse; transmitter-receiver means responsive to each radar pulse for independently generating a delayed reply pulse and incluuding an adjustable time-delay circuit for enabling adjustment of the time delay of the reply pulse for determining the operating condition of the radar system at other selected time intervals after each radar pulse; and switching means for selectively coupling either the transmission line or the transmitter-receiver means to the radar system at a point common to both the transmitter and the receiver for enabling the transmission line to provide a reference pulse to establish a reference operating condition to which the measurements obtained by the transmitter-receiver means may be referred.

References Cited in the file of this patent

UNITED STATES PATENTS

| | | |
|---|---|---|
| 2,421,016 | Deloraine et al. | May 27, 1947 |
| 2,477,485 | Jacob | July 26, 1949 |
| 2,532,539 | Counter et al. | Dec. 5, 1950 |